United States Patent
Okamoto

(10) Patent No.: US 7,824,572 B2
(45) Date of Patent: Nov. 2, 2010

(54) LIQUID CRYSTALLINE POLYESTER COMPOSITION

(75) Inventor: Satoshi Okamoto, Tsukuba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 12/633,091

(22) Filed: Dec. 8, 2009

(65) Prior Publication Data

US 2010/0084609 A1   Apr. 8, 2010

Related U.S. Application Data

(63) Continuation of application No. 12/213,575, filed on Jun. 20, 2008, now abandoned.

(30) Foreign Application Priority Data

Jun. 27, 2007   (JP) .............................. 2007-168688

(51) Int. Cl.
  $C09K\ 19/38$   (2006.01)
  $C09K\ 19/54$   (2006.01)
  $C09K\ 19/32$   (2006.01)
  $C09K\ 19/12$   (2006.01)
  $C09K\ 19/20$   (2006.01)
  $C09K\ 19/52$   (2006.01)
  $B32B\ 15/09$   (2006.01)

(52) U.S. Cl. .............................. 252/299.01; 252/299.5; 252/299.62; 252/299.66; 252/299.67; 428/480

(58) Field of Classification Search ................ 428/480; 252/299.01, 299.5, 299.62, 299.66, 299.67
  See application file for complete search history.

(56) References Cited

FOREIGN PATENT DOCUMENTS

| JP | 7-47667 B | 5/1995 |
| JP | 2003-277632 | 10/2003 |
| JP | 2005-248052 | 9/2005 |
| JP | 2009057409 A * | 3/2009 |

* cited by examiner

*Primary Examiner*—Shean C Wu
(74) *Attorney, Agent, or Firm*—Foley & Lardner LLP

(57) ABSTRACT

The present invention provides a liquid crystalline polyester composition comprising a terphenyl and a liquid crystalline polyester, wherein the terphenyl substantially consists of p-terphenyl, and the p-terphenyl is contained in the composition in the amount of 0.3 to 15 parts by weight on the basis of 100 parts by weight of the liquid crystalline polyester. The liquid crystalline polyester composition has high flowability and low anisotropy, which can also suppress generation of gases when molded.

6 Claims, 1 Drawing Sheet

Thickness of Product: 0.2mm
Runner: φ3.0mm
Gate: 0.2t×1.5w×2.0L

LIQUID CRYSTALLINE POLYESTER COMPOSITION

This application is continuation of Ser. No. 12/213,575 filed Jun. 20, 2008, now abandoned.

BACKGROUND OF THE INVENTION

1. Field of the Invention

The present invention relates to a liquid crystalline polyester composition. Further, the present invention relates to a molded article using the liquid crystalline polyester composition.

2. Description of the Related Art

Since liquid crystal polymers are excellent in moldability, mechanical characteristics, heat resistance and the like, there are expanding demands in injection molding applications mainly including the application in electric and electronic components.

It is known a liquid crystalline polyester composition containing fillers such as glass fibers, to produce electric and electronic components. The components, however, tend to have anisotropy, undesirably. Although the anisotropy of the liquid crystalline polyester composition may be reduced when a lot of glass fibers are contained, flowability of the composition tends to be deteriorated. Further, in aiming at improving flowability of a thermoplastic resin composition containing fillers, it is known a method of utilizing a terphenyl derivative, for example, in Japanese Unexamined Patent Publication No. 2003-277632.

SUMMARY OF THE INVENTION

However, when the resin composition disclosed in Japanese Unexamined Patent Publication No. 2003-277632 is melt molded, gas is generated from the molten resin composition, which results in voids in the molded article. Also, when the resulting molded article is soldered by, for example, a solder reflow process, bulge (blister defect) may occur on the surface of the molded article.

Under such circumstances, the inventors of the present invention have conducted research for obtaining a liquid crystalline polyester composition which can provide an molded article useful for electric and electronic components and the like. One of objects of the present invention is to provide a liquid crystalline polyester composition having high heat resistance capable of suppressing blister defect or the like while having high flowability and reduced anisotropy even when the liquid crystalline polyester composition is made into a molded article (such as electric and electronic components) with a complicated shape.

In order to achieve the above-mentioned object and other objects, the present inventors have studied on a liquid crystalline polyester composition. As a result, the present inventors have found a liquid crystalline polyester composition having high flowability and low anisotropy, which can also suppress generation of gases when molded, and have accomplished the present invention.

The present invention provides a liquid crystalline polyester composition comprising a terphenyl and a liquid crystalline polyester, wherein the terphenyl substantially consists of p-terphenyl, and the p-terphenyl is contained in the composition in the amount of 0.3 to 15 parts by weight on the basis of 100 parts by weight of the liquid crystalline polyester. Also, the present invention provides a molded article obtained from the liquid crystalline polyester composition.

The liquid crystalline polyester composition of the present invention can provide a molded article having high heat resistance capable of suppressing blister defect or the like while maintaining high flowability of the liquid crystalline polyester therein and reducing anisotropy of the polyester. Such a molded article can be used preferably in electric and electronic components with complicated shapes, in particular, in surface-mount components, and therefore can be industrially very useful.

DETAILED DESCRIPTION OF THE PREFERRED EMBODIMENTS

Figure 1:
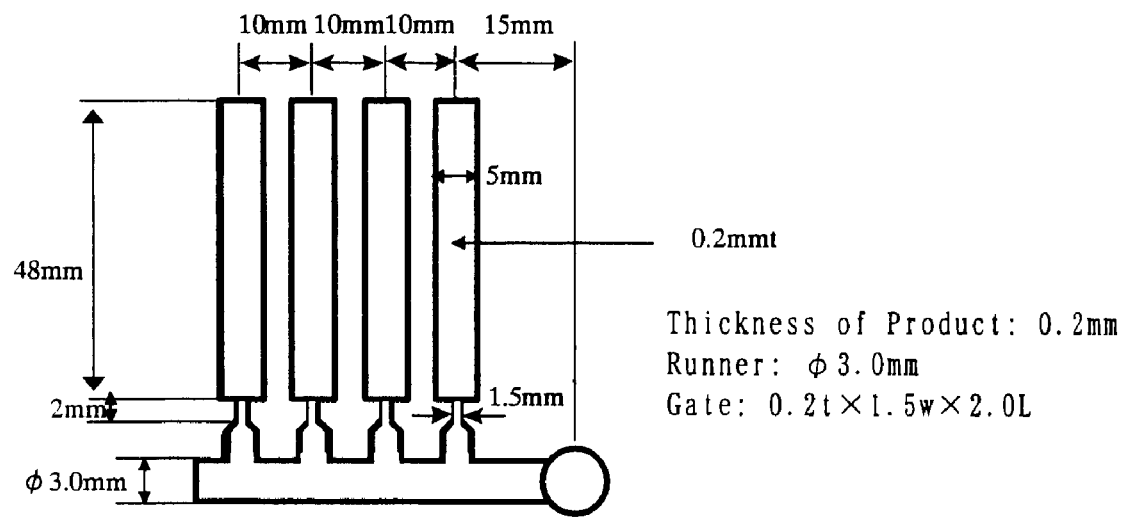
FIG. 1 is a schematic view showing a shape of mold for measuring a thin-wall flow length used in evaluation of thin-wall flowability in Examples.

A liquid crystalline polyester composition of the present invention comprises a terphenyl and a liquid crystalline polyester. The terphenyl in the composition substantially consists of p-terphenyl. The p-terphenyl is contained in the composition in the amount of 0.3 to 15 parts by weight on the basis of 100 parts by weight of the liquid crystalline polyester.

The liquid crystalline polyester is one of thermotropic liquid crystalline polymers and can be in a molten phase having optical anisotropy at a temperature of 450° C. or lower.

Examples of the liquid crystalline polyester include:

(1) polymers having structure units derived from an aromatic hydroxycarboxylic acid, structure units derived from an aromatic dicarboxylic acid and structure units derived from an aromatic diol;

(2) polymers having structure units derived from different kinds of aromatic hydroxycarboxylic acids;

(3) polymers having structure units derived from an aromatic dicarboxylic acid and structure units derived from an aromatic diol; and (4) polymers obtained by reacting a crystalline polyester such as polyethylene terephthalate with an aromatic hydroxycarboxylic acid.

The aromatic hydroxycarboxylic acid, the aromatic dicarboxylic acid and the aromatic diol, which can be used as raw materials for deriving the above-mentioned structure units, may be exchanged with derivatives of ester-forming derivatives corresponding thereto.

Examples of the ester-forming derivatives of the compounds having carboxylic groups include compounds having a carboxyl group which can promote polyester production (such as a chloride or an anhydride); and esters of carboxylic acids with alcohols or ethylene glycols which can form polyesters by transesterification reaction.

The aromatic hydroxycarboxylic acid, aromatic dicarboxylic acid and aromatic diol may have, as substituent, halogen atoms such as a chlorine atom and fluorine atom, alkyl groups such as a methyl group and ethyl group and aryl groups such as a phenyl group, as long as the amount of substituents is in the range where the ester-forming properties are not deteriorated.

Examples of structural units of the liquid crystalline polyester are as follows.

Examples of structural units derived from aromatic hydroxycarboxylic acid are represented below:

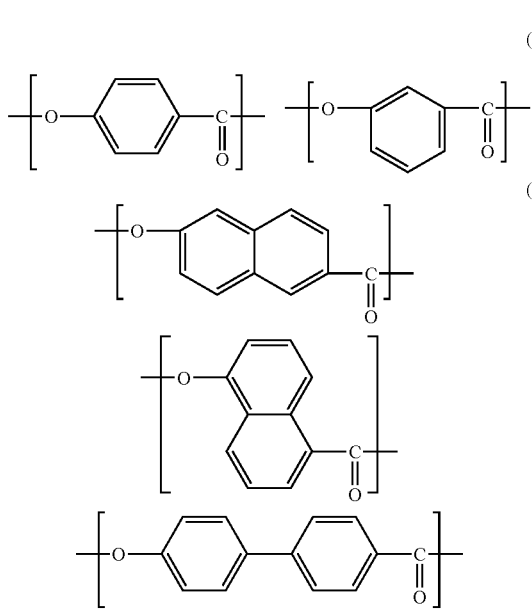
(A₁)
(A₂)

In the structural units shown above, apart or all of the hydrogen atoms bonding the aromatic ring may be substituted with a halogen atom, an alkyl group or an aryl group.

Examples of structural units derived from aromatic dicarboxylic acid are represented below:

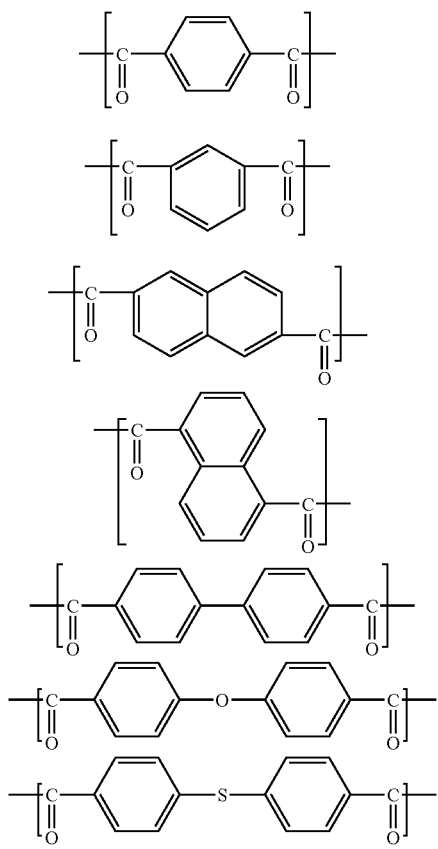
(B₁)
(B₂)
(B₃)

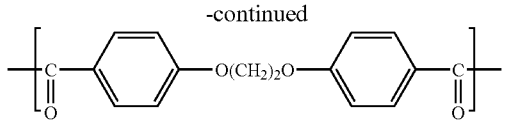

In the structural units shown above, a part or all of the hydrogen atoms bonding the aromatic ring may be substituted with a halogen atom, an alkyl group or an aryl group.

Examples of structural units derived from aromatic diol are represented below:

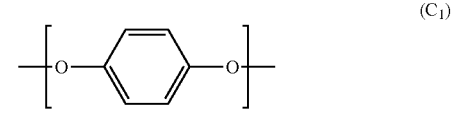
(C₁)

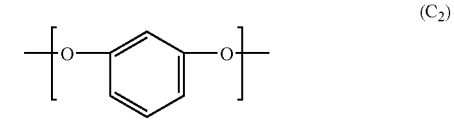
(C₂)

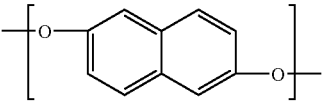

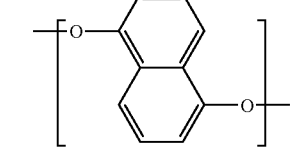

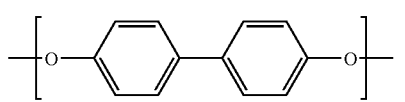
(C₃)

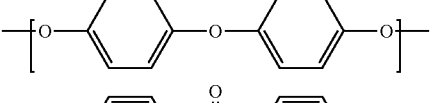

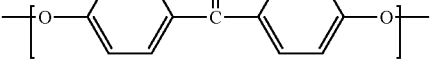

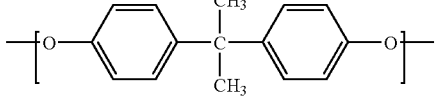
(C₄)

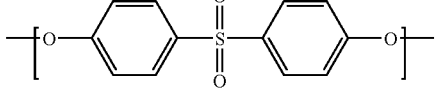
(C₅)

In the structural units shown above, a part or all of the hydrogen atoms bonding the aromatic ring may be substituted with a halogen atom, an alkyl group or an aryl group.

The alkyl group preferably has 1 to 10 carbon atoms, and is more preferably a methyl group, an ethyl group or a butyl group. The aryl group preferably has 6 to 20 carbon atoms, and is more preferably a phenyl group.

Examples of preferable combinations of the structural units shown above include the following combinations (a) to (f).

(a): combination of the structural units ($A_1$), ($B_2$) and ($C_3$);
combination of the structural units ($A_2$), ($B_2$) and ($C_3$);
combination of the structural units ($A_1$), ($B_1$), ($B_2$) and ($C_3$);
combination of the structural units ($A_2$), ($B_1$), ($B_2$) and ($C_3$); and
combination of the structural units ($A_2$), ($B_3$) and ($C_3$), (b): combinations (a) in which a part or all of structural unit ($C_3$) is replaced by structural unit ($C_1$), (c): combinations (a) in which a part or all of structural unit ($C_3$) is replaced by structural unit ($C_2$), (d): combinations (a) in which a part or all of structural unit ($C_3$) is replaced by structural unit ($C_4$), (e): combinations (a) in which a part or all of structural unit ($C_3$) is replaced by structural units ($C_4$) and ($C_5$), and (f): combinations (a) in which a part of ($A_1$) is replaced by structural unit ($A_2$).

In view of heat resistance, it is preferred to use a liquid crystalline polyesters having:

30 to 80% by mole of structural units derived from at least one aromatic hydroxycarboxylic acid selected from the group consisting of p-hydroxybenzoic acid and 2-hydroxy-6-naphthoic acid;

10 to 35% by mole of structural units derived from at least one aromatic diol selected from the group consisting of hydroquinone and 4,4'-dihydroxybiphenyl; and 10 to 35% by mole of structural units derived from at least one aromatic dicarboxylic acid selected from the group consisting of terephthalic acid, isophthalic acid and 2,6-naphthalenedicarboxylic acid;

on the basis of 100% by mole of all of structural units of the liquid crystalline polyester.

In view of balance between heat resistance and mechanical property, the liquid crystalline polyester preferably contains 30% by mole or more of the structural units expressed by unit ($A_1$) (which is a structural unit derived from p-hydroxybenzoic acid).

A weight-average molecular weight of a liquid crystalline polyester used in the present invention is not limited, and may be in the range of 10,000 to 100,000.

A liquid crystalline polyester used in the present invention can be produced, for example, by a melt polymerization in which an aromatic hydroxycarboxylic acid and an aromatic diol are acylated with excess of aliphatic acid anhydride to obtain acylated compounds, followed by polycondensation in which acyl groups of the resulting acylated compounds (i.e., acylated aromatic hydroxycarboxylic acid and acylated aromatic diol) and carboxyl groups of the aromatic hydroxycarboxylic acid and aromatic dicarboxylic acid are subjected to ester exchange. Is noted that the aromatic dicarboxylic acid may concomitantly be used at the acylation step. Since aromatic dicarboxylic acid is not so affected by an aliphatic acid anhydride, an aromatic hydroxycarboxylic acid, aromatic diol and aromatic dicarboxylic acid may be used in combination at the acylation step. Alternatively, a liquid crystalline polyester used in the present invention can be produced by another melt polymerization in which an acylated aromatic hydroxycarboxylic acid and an acylated aromatic diol previously prepared, followed by polycondensation in which those acylated compounds and an aromatic dicarboxylic acid are subjected to ester exchange.

In the acylation reaction, the aliphatic acid anhydride is preferably used in the amount of 1 to 1.2 times, more preferably in the amount of 1.05 to 1.1 times, in equivalent relative to the total amount of phenolic hydroxyl groups in the aromatic hydroxycarboxylic acid and the aromatic diol. When the amount of aliphatic acid anhydride used is too small, the acylated compounds, aromatic hydroxycarboxylic acid, aromatic dicarboxylic acid and the like tend to sublime in the ester exchange (polycondensation), which may result in the case where the reaction system is clogged. When the amount of aliphatic acid anhydride used is too large, coloring of the resulting liquid crystalline polyester may occur.

The acylation reaction is preferably conducted at the temperature of from 130 to 180° C. for 5 minutes to 10 hours, and is more preferably conducted at the temperature of from 140 to 160° C. for 10 minutes to 3 hours.

The aliphatic acid anhydride used in the acylation reaction is not limited. Examples of the aliphatic acid anhydride include acetic anhydride, propionic anhydride, butyric anhydride, isobutyric anhydride, valeric anhydride, pivalic anhydride, 2-ethylhexanoic anhydride, monochloroacetic anhydride, dichloroacetic anhydride, trichloroacetic anhydride, monobromoacetic anhydride, dibromoacetic anhydride, tribromoacetic anhydride, monofluoroacetic anhydride, difluoroacetic anhydride, trifluoroacetic anhydride, glutaric anhydride, maleic anhydride, succinic anhydride, β-bromopropionic anhydride and the like. The aliphatic acid anhydride may be used in mixture of 2 kinds or more thereof. From the viewpoints of cost and handling easiness, acetic anhydride, propionic anhydride, butyric anhydride and isobutyric anhydride are preferably used, and more preferably acetic anhydride is used.

In the ester exchange, the amounts of acylated compounds and aromatic dicarboxylic acid are preferably decided so that the total amount of acyl groups in the acylated aromatic hydroxycarboxylic acid and the acylated aromatic diol may be 0.8 to 1.2 times in equivalent of carboxyl groups in aromatic dicarboxylic acid.

Ester exchange is preferably performed at a temperature of from 130 to 400° C. while raising the temperature at a rate of 0.1 to 50° C./min, and is more preferably performed at a temperature of from 150 to 350° C. while raising the temperature at a rate of 0.3 to 5° C./min.

In ester exchange, to shift the equilibrium, it is preferable that an aliphatic acid produced as by-product and an unreacted aliphatic anhydride are distilled off outside a reaction system, by evaporation etc.

The acylation reaction and ester exchange may be performed in the presence of a catalyst. The catalyst may be a conventionally known catalyst for polymerization of polyester. Examples of the catalyst include metal salt catalysts such as magnesium acetate, stannous acetate, tetrabutyltitanate, lead acetate, sodium acetate, potassium acetate, antimony trioxide; and organic compound catalysts such as N,N-dimethylaminopyridine and N-methylimidazole. The catalyst can be added to the reaction mixture concomitantly in feeding monomers. After acylation, the catalyst is not always removed out of the reaction mixture, which may be followed by the ester exchange. When electric and electronic components are produced from the resulting liquid crystalline polyester composition of the present invention, the catalyst is preferably an organic compound catalyst since it is preferable that no metal constituent is contained in the components.

When polymerization through ester exchange is conducted by the melt polymerization, both of melt polymerization and solid-phase polymerization may be carried out. For example, the solid-phase polymerization can be conducted in a manner such that the product (polymer) obtained by a melt polymerization reactor is drawn out of the melt polymerization reactor, is crushed to have a powder form or flake form, followed by the solid-phase polymerization. The solid phase polymerization can be carried out while conducting a heat treatment in a solid-phase state at a temperature of form 20 to 350° C. under inert atmosphere such as nitrogen for 1 to 30 hours. The solid phase polymerization may be performed while stirring or may be performed in a standing still state without stirring. By equipping a suitable stirring mechanism, the melt polymerization and solid phase polymerization can be performed in the same reaction vessel. After the solid phase polymerization, the liquid crystalline polyester obtained may be palletized, and be molded by a known method.

The liquid crystalline polyester can be produced using any batch equipment or continuous equipment.

In the present invention, a liquid crystalline polyester composition comprises a terphenyl and a liquid crystalline polyester, and the terphenyl substantially consists of p-terphenyl. The terphenyl may be substantially only p-terphenyl, which means that a high-purity, commercially available p-terphenyl can be used in the present invention as the terphenyl without removing unintended impurities out of the high-purity p-terphenyl. For example, a highest quality reagent p-terphenyl, available from Kanto Chemical Co., Inc., may be used in the present invention.

It is preferable that a nonpolar organic compound contained in the liquid crystalline polyester composition of the present invention is substantially only p-phenyl. The nonpolar organic compound herein means a hydrocarbon compound having carbon atoms and hydrogen atoms with no hetero atoms such as an oxygen atom, nitrogen atom and sulfur atom in its molecule.

The present inventors studied in detail on a molded article obtained by a resin composition having terphenyl. As a result, is has been found that when the terphenyl in the composition contains m-terphenyl or o-terphenyl, gas is generated in molding which leads to blister defect of the molded article. Therefore, in the present invention, substantially only p-terphenyl is used in the liquid crystalline polyester as a nonpolar organic compound, to attain high flowability and reduce anisotropy of the liquid crystalline polyester. Such excellent effects can be achieved even when a small amount of p-terphenyl is used in the present invention. The present inventors have found that the effects of reducing anisotropy of the liquid crystalline polyester composition can be more remarkable especially when the liquid crystalline polyester composition is prepared by melt kneading (described below). The exhibition of such effects is based on the unique finding of the present inventors. The effects of the present invention were unexpected because p-terphenyl is a rigid molecule, and therefore, was conventionally thought to deteriorate anisotropy of the liquid crystalline polyester composition (see, Japanese Unexamined Patent Publication No. 2005-248052, paragraph [0006]).

In the liquid crystalline polyester composition of the present invention, 0.3 to 15 parts by weight of the p-terphenyl is contained on the basis of 100 parts by weight of the liquid crystalline polyester. The p-terphenyl is preferably contained in the range of form 0.5 to 12 parts by weight, and is more preferably 1 to 10 parts by weight, on the basis of 100 parts by weight of the liquid crystalline polyester.

When the amount of p-terphenyl is in the above-described range, the high flowability and the reducing of anisotropy of the liquid crystalline polyester are more highly exhibited, and there is little stain of a mold in molding, which is preferable.

In the liquid crystalline polyester composition of the present invention, fillers can also be used to provide other characteristics such as mechanical strength. The fillers may be fibrous fillers or may be nonfiber fillers in the form of plate, powder, granule and the like. Examples of fillers include a glass fiber, carbon fiber of PAN type or pitch type, metal fibers such as a stainless steel fiber, aluminum fiber and brass fiber, organic fibers such as an aromatic polyamide fiber, gypsum fiber, ceramic fiber, zirconia fiber, alumina fiber, silica fiber, titanium oxide fiber, silicon carbide fiber, rock wool, potassium titanate whisker, barium titanate whisker, aluminum borate whisker and silicon nitride whicker; and powdery, granular or platy fillers including mica, talc, kaolin, silica, calcium carbonate, glass bead, glass flake, glass microballoon, clay, molybdenum disulfide, wollastonite, titanium oxide, zinc oxide, calcium polyphosphate and graphite. Fillers made of carbon materials and inorganic materials are preferable, and fillers made of inorganic materials (inorganic fillers) are more preferable. Among the inorganic fillers, a glass fiber and talc are preferably used, a glass fiber is more preferable. The glass fiber is not limited, and may be a conventionally used glass fiber which is known as a filler for reinforcing resins. The glass fiber may be a chopped strand of a filament type or staple type or may be a milled fiber.

The above-described fillers can be used in combination of 2 kinds or more thereof. The surface of the filler may be previously treated with a well-known coupling agent (such as silane based coupling agent, titanate based coupling agent etc.) or other surface treating agent.

When the filler is added to a liquid crystalline polyester, the amount of the filler may be in the range of from 0.1 to 400 parts by weight, is preferably in the range of from 10 to 200 parts by weight, and is more preferably in the range of from 20 to 100 parts by weight, and is most preferably in the range of from 20 to 80 parts by weight, on the basis of 100 parts by weight of the liquid crystalline polyester.

It is preferred that the amount of filler is appropriately selected so that flowability of the resulting liquid crystalline polyester composition is not markedly deteriorated.

The liquid crystalline polyester composition may further comprises additives such as antioxidant and heat stabilizer (for example, hindered phenol, hydroquinone, phosphites and their substitution products etc.), ultraviolet absorber (for example, resorcinol, salicylate etc.), color protection agents such as phosphite and hypophosphite, lubricant and mold lubricant (montanic acid and its metal salt, its ester, its half ester, stearyl alcohol, stearamide, polyethylene wax etc.), coloring agents including dye and pigment, carbon black as conductive agent or coloring agent, nucleation agent, fire retardant (brome based fire retardant, phosphor based fire retardant, red phosphorous, silicone based fire retardant etc.), plasticizer, fire retardant auxiliaries, and antistatic agent. Such additives are distinguished clearly from the above-described nonpolar organic compounds because of having a group containing a hetero atom such as a polar functional group. It is preferred that the amount of additives is appropriately selected so that heat resistance (related to blister defect) of the resulting molded article is not deteriorated.

The liquid crystalline polyester composition of the present invention may further comprise a thermoplastic resin other than the liquid crystalline polyester. When the thermoplastic resin other than the liquid crystalline polyester is used, the kind and the amount of the thermoplastic resin are appropriately decided so that mechanical properties, heat resistance and the like of the liquid crystalline polyester are not so lowered.

As described above, the liquid crystalline polyester composition of the present invention can contain other thermoplastic resins and additives in combination. Preferable embodiments may be a composition containing a liquid crystalline polyester and a p-terphenyl, and a composition containing a liquid crystalline polyester, a p-terphenyl and at least one filler selected from inorganic material fillers and carbon material fillers.

The preferable liquid crystalline polyester composition of the present invention can be prepared by a method described below:

p-Terphenyl, or combination of p-terpheny and filler, is compounded in a liquid crystalline polyester by melt kneading. A known method can be applied as the melt kneading. For example, a liquid crystalline polyester composition is produced by melt kneading (using a Banbury mixer, a rubber roll machine, a kneader, a uniaxial or biaxial extruder) of the above-mentioned ingredients at a temperature of from 180 to 420° C., preferably at a temperature of from 250 to 380° C., and more preferably at a temperature of from 280 to 360° C. When the melt kneading is conducted, any following method may be used: 1) a lump kneading of a liquid crystalline polyester, p-terphenyl and an optional filler; 2) a master pellet method in which a p-terphenyl is added at a high concentration to a liquid crystalline polyester to prepare a liquid crystalline polyester composition (master pellet), to which a liquid crystalline polyester and an optional filler is blended and kneaded.

The additives can be added to the liquid crystalline polyester composition, without being melt kneaded therewith. For example, additives may be mixed in powder form with pellets of the liquid crystalline polyester composition by Henshel mixer or the like, which can be used for injection molding, directly.

The thus obtained liquid crystalline polyester composition is excellent in flowability upon melt processing, the anisotropy is sufficiently reduced, even when a molding of the composition is conducted using a mold having flow paths with different cross sections and parts with different thicknesses. Even in such a case, overfilling is difficult to occur in the part of thick wall, and a stable molding can be carried out.

The liquid crystalline polyester composition of the present invention can be processed by known methods including a injection molding method, an extrusion molding and a press molding, to provide a three-dimensional molded article, sheet, container, pipe, film or the like having an excellent surface appearance (color tone), mechanical property, heat resistance and flame resistance. Above all, since the liquid crystalline polyester composition of the present invention is excellent in flowability and the anisotropy is sufficiently reduced, it is suitable for preparing surface-mount components such as connecter, relay case, coil bobbin and switch. In particular, since the liquid crystalline polyester composition of the present invention has high flowability, it shows a good moldability in regard to surface-mount components with relatively complicate shapes.

As mentioned above, the liquid crystalline polyester composition of the present invention is preferable particularly to produce surface-mount components, and it can be used for other applications. For example, the liquid crystalline polyester composition of the present invention can be used in the following applications: electric and electronic components typified by various gears, various cases, sensor, LED lamp, resistor, optical pickup, oscillator, various terminals, transformer, plug, printed circuit board, tuner, speaker, microphone, headphone, small-size motor, magnetic head base, power module, housing, semiconductor, liquid crystal display component, FDD carriage, FDD chassis, HDD component, motor brush holder, satellite dish, computer-related component; home and office appliance components typified by VTR component, TV component, iron, hair dryer, rice cooker component, microwave component, voice device components such as acoustic component, audio, laser disk, compact disk, illumination component, refrigerator component, air conditioner component, typewriter component and word processor component; machine-related components typified by office computer-related components, telephone-related components, facsimile-related components, copier-related components, washing tool, various bearings such as non-oil bearing, boat-tail bearing and bearing in water, motor component, lighter and typewriter; optical device- and precision machine-related components typified by microscope, binoculars, camera and watch; automobile and vehicle-related components typified by alternator terminal, alternator connector, IC regulator, potentiometer base for light dia, various valves such as exhaust gas valve, various pipes of fuel system, exhaust system and intake system, air-intake nozzle snorkel, intake manifold, fuel pump, engine cooling water joint, carburetor main body, carburetor spacer, exhaust gas sensor, cooling water sensor, oil temperature sensor, throttle position sensor, crankshaft position sensor, airflow meter, brake pad abrasion sensor, thermostat base for air conditioning, motor insulator for air conditioning, flow control valve of heating warm air, brush holder for radiator motor, water pump impeller, turbine vane, wiper motor related component, distributor, starter switch, starter relay, wire harness for transmission, wind washer nozzle, air conditioner panel switch board, coil for fuel-related magnetic valve, connector for fuse, phone terminal, electric component insulating board, step mog, brake piston, solenoid bobbin, engine oil filter and ignition device case. When used as a film, there are listed a film for magnetic recording medium, film for picture, film for condenser, film for electric insulation, packaging film, film for drawing, film for ribbon; as sheet applications such as car internal ceiling, door trim, pad member for instrument panel, cushioning material for bumper and side frame, sound absorbing pad for bonnet etc., member for seat, pillar member, fuel tank, brake hose, nozzle for windshield washer liquid, cooling tube for air conditioner, and their peripheral components.

The invention being thus described, it will be apparent that the same may be varied in many ways. Such variations are to be regarded as within the spirit and scope of the invention, and all such modifications as would be apparent to one skilled in the art are intended to be within the scope of the following claims.

The entire disclosure of the Japanese Patent Application No. 2007-168688 filed on Jun. 27, 2007, including specification, claims, drawings and summary, are incorporated herein by reference in their entirety.

EXAMPLES

The present invention is described in more detail by following Examples, which should not be construed as a limitation upon the scope of the present invention.

Measuring Method of Flow Starting Temperature:

Using a flow tester (manufactured by Shimadzu Corporation, "CFT-500 model"), about 2 g of a sample is filled in a capillary type rheometer equipped with a die of 1 mm in inner diameter and 10 mm in length. When a liquid crystal polymer is extruded from a nozzle at a rate of raising temperature of 4° C./min under a load of 9.8 MPa (100 kg/cm$^2$), a temperature that melt viscosity shows 4800 Pa·s (48000 poises) is defined as a flow starting temperature.

Measuring Method of Gas Generated:

A dumbbell of 0.8 mm thickness according to JIS K71131 (½) was weighed by 5 g in a glass bottle, after being sealed, heat-treated at 120° C. for 20 hours, a total amount of acetic acid gas generated was measured by a head space-gas chromatograph (manufactured by Shimadzu Corporation; GC 15A/HSS3A).

Thin-Wall Flowability:

Using a mold for measuring thin wall flow length equipped with 4 cavities of 0.2 mm or 0.3 mm in thickness of a product part shown in FIG. 1, a sample was molded at a measuring temperature of 350° C. (injection speed 95%, injection pressure 900 Kg/cm$^2$) by an injection molder (manufactured by Nissei Plastic Industrial Co., Ltd.; PS10E1ASE model). The lengths of 4 cavity parts of the molded article taken out were measured, and the average thereof was defined as a thin wall flow length. Flow anisotropy was calculated through dividing the average when a mold of 0.2 mm was used by the average when a mold of 0.3 mm was used.

Synthesis Example 1

A reactor equipped with a stirring device, torque meter, nitrogen gas-introducing tube, thermometer and reflux condenser was charged with 911 g (6.6 mol) of p-hydroxybenzoic acid, 409 g (2.2 mol) of 4,4'-dihydroxybiphenyl, 274 g (1.65 mol) of terephthalic acid, 91 g (0.55 mol) of isophthalic acid and 1235 g (12.1 mol) of acetic anhydride. After the inside of the reactor was sufficiently replaced with nitrogen gas, the temperature of the mixture was raised to 150° C. over 15 minutes under a nitrogen gas stream, and refluxed while maintaining the temperature for 3 hours.

Thereafter, the temperature of the mixture was raised to 320° C. over 2 hours and 50 minutes while acetic acid as by-product and unreacted acetic anhydride were distilled out. At the time point that increase of torque was observed (which was assumed as completion of reaction), the content was taken out of the reactor. The resulting solid content was cooled to room temperature, crushed by a coarse crusher, then the temperature thereof was raised from room temperature to 250° C. over 1 hour under nitrogen atmosphere, raised from 250° C. to 288° C. over 5 hours, and held at 288° C. for 3 hours to perform a solid-phase polymerization. The flow starting temperature of the obtained liquid crystalline polyester was 325° C., and it was confirmed that a schlieren pattern characteristic of a nematic liquid crystal was shown at 370° C. by a polarization microscope. This liquid crystalline polyester is referred to as LCP 1.

Synthesis Example 2

The same reactor as used in Synthesis example 1 was charged with 1034.99 g (5.5 mol) of 2-hydroxy-6-naphthoic acid, 272.52 g (2.475 mol) of hydroquinone, 378.33 g (1.75 mol) of 2,6-naphthalenedicarboxylic acid, 83.07 g (0.5 mol) of terephthalic acid, 1226.87 g (11.9 mol) of acetic anhydride, and 0.17 g of and 1-methylimidazole as a catalyst, the mixture was stirred at room temperature for 15 minutes, then the temperature was raised during stirring. When the internal temperature became 145° C., it was stirred for 1 hour while maintaining the same temperature.

Next, the temperature of the mixture was raised from 145° C. to 310° C. over 3 hours and 30 minutes while acetic acid distilled as by-product was distilled out and unreacted acetic anhydride. A liquid crystal polymer was obtained by maintaining the same temperature for 3 hours. The resulting liquid crystal polymer was cooled to room temperature, crushed by a crusher to obtain powders of the liquid crystal polymer (prepolymer) of about 0.1 to 1 mm in particle diameter.

This prepolymer was measured for flow starting temperature using a flow tester to find that it was 267° C.

The temperature of the resulting powder was raised from 25° C. to 250° C. over 1 hour, raised from the same temperature to 310° C. over 10 hours, and next held at the temperature for 5 hours to conduct a solid phase polymerization. Thereafter, the powder after the solid phase polymerization was cooled to obtain a liquid crystal polymer in powder form. The flow starting temperature of the liquid crystalline polyester obtained was 333° C., and it was confirmed that a schlieren pattern characteristic of a nematic liquid crystal was shown at 370° C. by a polarization microscope. This liquid crystalline polyester is referred to as LCP 2.

Example 1

In 100 parts by weight of LCP 1 obtained in Synthesis example 1, 3 parts by weight of p-terphenyl (highest quality reagent obtained from Kanto Chemical Co., Ltd.) was compounded, and then, milled glass (EFH-7501) manufactured by Central Glass Co., Ltd. was compounded so as to be 40% by weight relative to the whole, and mixed, then, granulated at 340° C. using a biaxial extruder (manufactured by Ikegai Corporation; PCM-30). Using an injection molder, PS40E5ASE model manufactured by Nissei Plastic Industrial Co., Ltd., the pellet obtained was subjected to injection molding at a cylinder temperature of 350° C. and a mold temperature of 130° C., characteristics of the resin (amount of gas generation, thin wall flowability and flow anisotropy) were evaluated. The results are shown in Table 1.

Examples 2 to 8

The same experiments as in Example 1 were performed except that the amount of p-terphenyl added in LCP 1 was changed to be the amounts shown in Table 1. The results are shown in Table 1.

Example 9

The same experiment as in Example 1 was performed except that LCP 2 obtained in Synthesis example 2 was used instead of using LCP 1. The result is shown in Table 1.

Comparative Examples 1 and 3

The same experiments as in Example 1 were performed except that no p-terphenyl was used (Comparative Example 1) or m-terphenyl was used (Comparative example 3) in the amount shown in Table 2. The results are shown in Table 2.

Comparative Example 2

The same experiment as in Example 1 was performed except that the amount of p-terphenyl added to LCP 1 was changed to 0.25 part by weight (on the basis of 100 parts by weight of LCP 1). The result is shown in Table 2.

TABLE 1

|  | Example 1 | Example 2 | Example 3 | Example 4 | Example 5 | Example 6 | Example 7 | Example 8 | Example 9 |
|---|---|---|---|---|---|---|---|---|---|
| Liquid crystalline polyester | LCP1 | LCP1 | LCP1 | LCP1 | LCP1 | LCP1 | LCP1 | LCP1 | LCP2 |
| Terphenyl*1 | PT | PT | PT | PT | PT | PT | PT | PT | PT |
| Amount of Terphenyl (part by weight*2) | 3 | 0.5 | 1 | 2 | 3 | 5 | 7 | 10 | 3 |
| 0.2 mmt Thin-wall flow length (mm) | 14 | 10 | 11 | 12 | 14 | 14 | 14 | 12 | 17 |
| 0.3 mmt Thin-wall flow length (mm) | 22 | 16 | 17 | 19 | 22 | 23 | 23 | 23 | 19 |
| Flow anisotropy | 0.64 | 0.67 | 0.64 | 0.63 | 0.64 | 0.61 | 0.61 | 0.52 | 0.89 |
| Gas generation (ppm) | 4 | 4 | 4 | 4 | 4 | 4 | 4 | 5 | 5 |

*1: PT: p-terphenyl
*2: On the basis of 100 parts by weight of liquid crystalline polyester

TABLE 2

|  | Comparative example 1 | Comparative example 2 | Comparative example 3 |
|---|---|---|---|
| Liquid crystalline polyester | LCP1 | LCP1 | LCP1 |
| Terphenyl *1 |  | PT | MT |
| Amount of Terphenyl (part by weight *2) | 0 | 0.25 | 3 |
| 0.2 mmt Thin wall flow length (mm) | 9 | 10 | — |
| 0.3 mmt Thin wall flow length (mm) | 15 | 14 | 18 |
| Flow anisotropy | 0.60 | 0.71 | — |
| Gas generation (ppm) | 3 | 4 | 8 |

*1: PT: p-terphenyl, MT: m-terphenyl
*2: On the basis of 100 parts by weight of liquid crystalline polyester The results of Examples 1 to 9 show that the liquid crystalline polyester compositions of the present invention were excellent in thin-wall flowability and flow anisotropy and suppressed the generation of gas. On the other hand, the results of Comparative Examples 1 and 2 (in which no p-terphenyl was used, and the amount of terphenyl is outside the range of the present invention, respectively) clearly show that the liquid crystalline polyester compositions outside the scope of the present invention has insufficient, lower thin-wall flowability compared to the composition of the present invention. Further, in Comparative Example 3 (in which m-terphenyl was used in place of p-terphenyl was used), the liquid crystalline polyester composition generates acetic acid gas in a larger concentration (much larger than 5 ppm), which shows that the composition having m-terphenyl (of Comparative Example 3) is not suitable for components (such as surface mount components) needed to be treated at a high temperature.

What is claimed is:

1. A liquid crystalline polyester composition comprising a terphenyl and a liquid crystalline polyester, wherein the terphenyl substantially consists of p-terphenyl, and the p-terphenyl is contained in the composition in the amount of 0.3 to 15 parts by weight on the basis of 100 parts by weight of the liquid crystalline polyester.

2. The liquid crystalline polyester composition according to claim 1, wherein the liquid crystalline polyester comprises the structural units shown in anyone of the combinations (a) to (f):

(a): combination of the structural units $(A_1)$, $(B_2)$ and $(C_3)$; combination of the structural units $(A_2)$, $(B_2)$ and $(C_3)$; combination of the structural units $(A_1)$, $(B_1)$, $(B_2)$ and $(C_3)$; combination of the structural units $(A_2)$, $(B_1)$, $(B_2)$ and $(C_3)$; and combination of the structural units $(A_2)$, $(B_1)$, $(B_2)$ and $(C_3)$; and (b): combinations (a) in which a part or all of structural unit $(C_3)$ is replaced by structural unit $(C_1)$;

(c): combinations (a) in which a part or all of structural unit $(C_3)$ is replaced by structural unit $(C_2)$, (d): combinations (a) in which a part or all of structural unit $(C_3)$ is replaced by structural unit $(C_4)$ (e): combinations (a) in which a part or all of structural unit $(C_3)$ is replaced by structural units $(C_4)$ and $(C_5)$, and (f): combinations (a) in which a part of $(A_1)$ is replaced by structural unit $(A_2)$, in which the structural units $(A_1)$-$(A_2)$, $(B_1)$-$(B_3)$ and $(C_1)$-$(C_3)$ are represented by the following formulas:

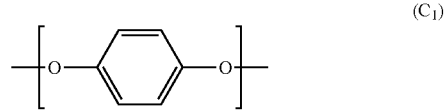

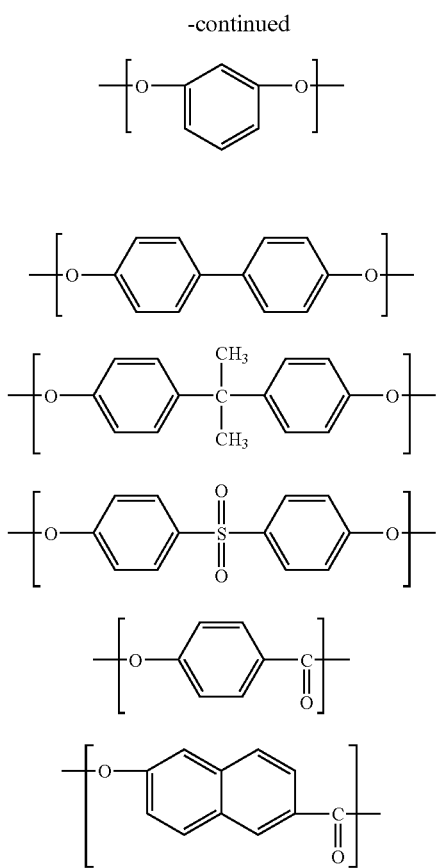

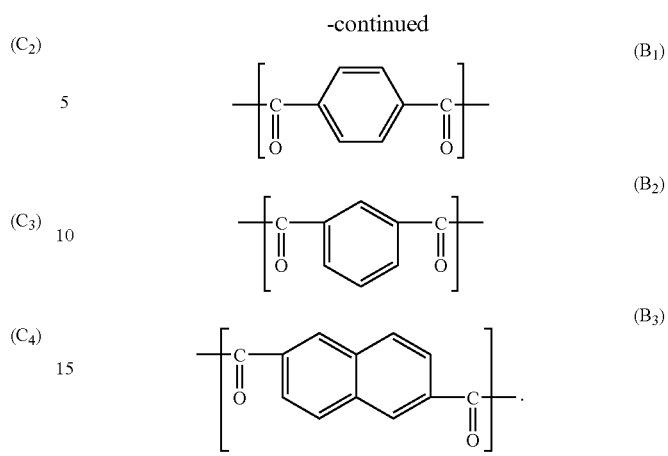

3. The liquid crystalline polyester composition according to claim 2, which is obtainable by melt-kneading the liquid crystalline polyester with the terphenyl.

4. The liquid crystalline polyester composition according to claim 2 or 3, further comprising an inorganic filler in an amount of 0.1 to 400 parts by weight on the basis of 100 parts by weight of the liquid crystalline polyester.

5. A molded article obtained by melt-molding the liquid crystalline polyester composition of claim 2.

6. A surface-mount component obtained by melt-molding the liquid crystalline polyester composition of claim 2.

* * * * *